United States Patent [19]

Endo et al.

[11] Patent Number: 4,774,130

[45] Date of Patent: Sep. 27, 1988

[54] MAGNETIC RECORDING MEDIUM

[75] Inventors: Juro Endo; Shiro Murakami; Shigeo Fujii; Shigeru Oguma; Masayuki Nakao, all of Saitama, Japan

[73] Assignee: Hitachi Metals, Ltd., Tokyo, Japan

[21] Appl. No.: 814,506

[22] Filed: Dec. 30, 1985

[30] Foreign Application Priority Data

Jan. 17, 1985 [JP] Japan .................................. 60-6592

[51] Int. Cl.$^4$ ................................................ G11B 5/72
[52] U.S. Cl. ................................ 428/216; 204/192.2; 204/192.16; 204/192.23; 427/131; 427/132; 428/215; 428/336; 428/408; 428/694; 428/695; 428/900; 428/457; 428/446
[58] Field of Search ............... 428/694, 698, 695, 900; 428/446, 408, 215, 216, 336; 427/128, 131; 204/192.2, 192.16, 192.22, 192.23, 192.17

[56] References Cited

U.S. PATENT DOCUMENTS

| 4,376,963 | 3/1983 | Knoop | 360/135 |
| 4,411,963 | 10/1983 | Aine | 428/900 |
| 4,503,125 | 3/1985 | Nelson | 428/900 |
| 4,554,217 | 11/1985 | Grimm | 428/900 |
| 4,592,948 | 6/1986 | Kohmoto | 427/131 |
| 4,608,293 | 8/1986 | Wada | 427/131 |
| 4,647,494 | 3/1987 | Meyerson | 427/39 |

FOREIGN PATENT DOCUMENTS

| 0033521 | 10/1979 | Japan | 428/694 |
| 0034143 | 6/1981 | Japan | 427/131 |
| 0145524 | 8/1985 | Japan | 428/695 |

Primary Examiner—Ellis P. Robinson
Attorney, Agent, or Firm—Finnegan, Henderson, Farabow, Garrett & Dunner

[57] ABSTRACT

A magnetic recording medium has a magnetic film formed on the surface of a substrate and a protective film further formed on the surface of the magnetic film. The protective film is composed of a first layer containing at least one substance selected from the group consisting of $Cr_2O_3$, Si, and Ge and a second layer of amorphous carbon or graphite containing amorphous carbon deposited on the front side of the first layer.

17 Claims, 2 Drawing Sheets

MAGNETIC RECORDING MEDIUM

BACKGROUND OF THE INVENTION

1. Field of the Invention

This invention relates to a magnetic recording medium, and more particularly to a magnetic recording medium incorporating therein a magnetic film and a protective film abounding with corrosionproofness formed on the front side of the magnetic film.

2. Description of the Prior Art

In recent years, research efforts have been emphatically devoted to the development of magnetic recording media incorporating therein an alloy magnetic film of high recording density. Among them is counted a magnetic recording medium which has a magnetic film formed on the surface of a substrate and a protective film further deposited on the magnetic film.

It is known to the art that this protective film can be made of any of various substances including metals such as osmium, ruthenium, iridium, manganese, and tungsten, oxides such as silicon oxide, titanium oxide, tantalum oxide, and hafnium oxide, various nitrides, carbides, boron, carbon, alloy of carbon with boron, polysilicic acid, and diamond-structure carbon (Japanese Patent Application Laid-open No. SHO 59(1984)-61,106).

Among the substances enumerated above, carbon enjoys popular acceptance for its excellent lubricating property. The protective film of carbon, however, exhibits relatively high permeability to $H_2O$ and $O_2$. It, therefore, is slightly deficient in the inherent protective function of conferring enhanced resistance to corrosion and weather conditions upon the magnetic film.

The protective films made of substances other than carbon are more or less superior in resistance to corrosion and weather conditions but are fairly inferior in lubricating property, to the protective film of carbon.

SUMMARY OF THE INVENTION

An object of this invention is to provide a magnetic recording medium incorporating therein a protective film excellent in resistance to corrosion and weather conditions.

Another object of this invention is to provide a magnetic recording medium incorporating therein a protective film excellent in lubricating property.

To accomplish the objects described above, the magnetic recording medium of this invention comprises a substrate, a magnetic film formed on the surface of the substrate, and a protective film deposited on the surface of the magnetic film and composed of a first layer containing at least one substance selected from the group consisting of $Cr_2O_3$, Si, and Ge and a second layer of amorphous carbon superposed on the front side of the first layer.

The other objects and characteristic features of the present invention will become apparent to those skilled in the art as the disclosure is made in the following description of preferred embodiments of the invention, as illustrated in the accompanying drawings.

DESCRIPTION OF THE PREFERRED EMBODIMENTS

Figure 1:
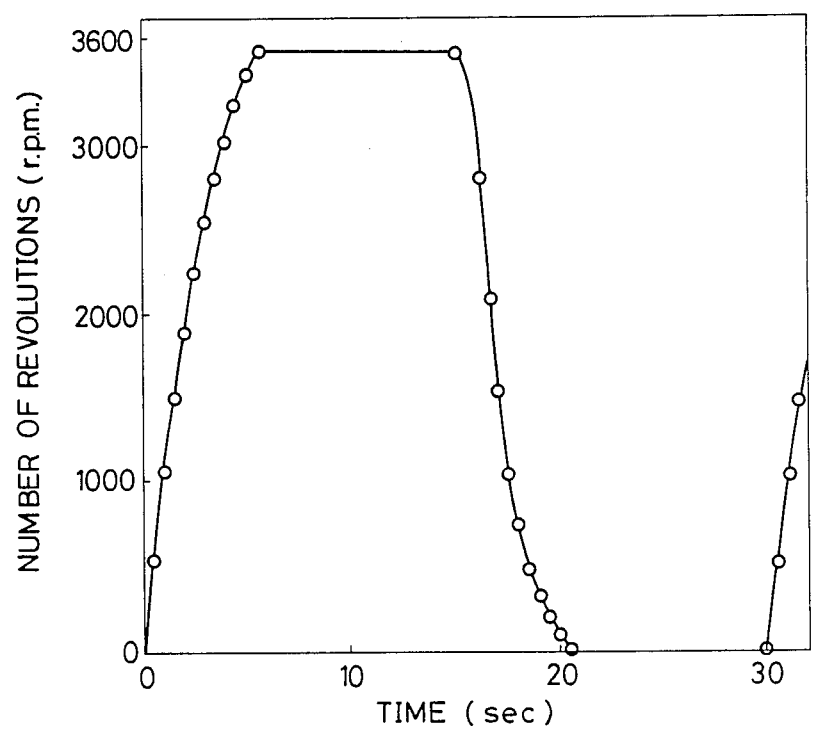
FIG. 1 is a diagram showing the rotary characteristic of a drive used in the test for CSS resistance in working examples and comparative experiments.

The inventors, after continuing a diligent study on the protective film to be formed on the magnetic film in the magnetic recording medium, have found that a protective film composed of a first layer containing at least one substance selected from the group consisting of $Cr_2O_3$, Si, and Ge and a second layer of amorphous carbon (C) or graphite comprising amorphous carbon superposed on the first layer excels in all the properties of resistance to corrosion, resistance to weather conditions, and lubricating property.

In this invention, the substrate is made of aluminum, aluminum alloy containing not more than 7% by weight, preferably 3 to 4% by weight, of magnesium, aluminum alloy containing zinc, or titanium alloy. Among materials available, the aluminum alloy proves particularly suitable because it is light, inexpensive, and easy of fabrication. In recent years, substrates made of ceramics have come to draw growing attention. For the purpose of this invention, such ceramic substrates as $ZrO_2$ or $Al_2O_3$ and even glass substrates are usable.

The substrate to be used herein has its surface finished in a flat and smooth state as by mechanical or chemical abrasion. On the substrate, a rigid undercoating layer such as of alumite or Ni-P alloy is formed for the purpose of preventing the disc surface from deformation due to head crush. (This undercoating layer is not always required when the substrate is made of ceramic substance.)

When the substrate is made of aluminum or aluminum alloy, the surface thereof is anodically oxidized to give rise to an alumite layer which is expected to function as an undercoating layer. Although the thickness of this alumite layer is not specifically limited, it generally falls in the range of several $\mu m$ to some tens of $\mu m$, as in the neighborhood of 10 $\mu m$. The alumite undercoating layer or the undercoating layer of Ni-P is desired to have its surface ground in preparation for the formation of the magnetic film thereon. The surface roughness is desired not to exceed 0.02 $\mu m$ in surface roughness Ra.

The surface may be polished mechanochemically by using a colloidal silica powder.

On the undercoating layer is formed the magnetic film.

The magnetic film can be formed of alloy or metal oxide. Examples of the alloy usable advantageously herein include Co-Ni, Co-Ni-Pt, Co-Ni-P, Co-Pt, Co-Cr, Co-Cr-Pt, Co-Ni-Cr. In these alloys, Fe can be substituted for part of Co or Ni. In the Co Ni alloy, at least one substance selected from the group consisting of Ti, Cr, Hf, Ru, and Pt can be incorporated to substitute for part of Co. A typical example of the oxide magnetic film is a magnetic film made of $\gamma$-$Fe_2O_3$.

The magnetic film described above can be formed by any of the conventional sputtering techniques such as, for example, a vapor-phase plating technique and a liquid-phase plating technique disclosed in Japanese Patent Application Laid-open No. SHO 56(1981)-41,524. The compositions and the methods of production described above are meant purely for illustration and are not limitative in any respect of this invention.

Desirably the magnetic films of Co-Ni, Co-Ni-Pt, and Co-Ni-P types contain Ni in concentrations falling in the range of 5 to 40 at. %, preferably 10 to 30 at. %. In the alloys containing Pt in addition to Co and Ni, their Pt contents are desired not to exceed 12 at. %, preferably 10 at. %. In the alloys containing P in addition to Co and Ni, their P contents are desired not to exceed 12 at. %. In the magnetic film of Co-Pt type, its Pt content is desired not to exceed 12 at. %, preferably 10 at. %.

In the Co-Cr type, Cr is contained 5 to 20 at %, preferably 5 to 7 at %. Co-Cr-Pt type contains Cr of 5 to 20 at %, preferably 5 to 7 at % and Pt of 1 to 10 at %, preferably 5 to 9 at %. Ni of 10 to 35 at % and Cr of 3 to 15 at % are contained in Co-Ni-Cr type, preferably Ni of 15 to 25 at % and Cr of 3 to 10 at % are contained therein.

Desirably, the magnetic film has a thickness in the range of 300 to 3,000 Å, preferably 500 to 1,500 Å. If the thickness of the magnetic film is less than 300 Å, the magnetic film fails to confer stable properties upon the magnetic recording medium. If the thickness exceed 3,000 Å, the formation of the magnetic film requires a very long time and the cost of its production increases.

On the magnetic film is formed a protective film which is composed of a first layer made of at least one substance selected from the group consisting of $Cr_2O_3$, Si, and Ge and a second layer of amorphous carbon or of graphite containing amorphous carbon deposited on the surface of the first layer. Specifically, the first layer can be formed of any of the seven substances, i.e. (1) Si alone, (2) Ge alone, (3) $Cr_2O_3$ alone, (4) Si-Ge, (5) Si-$Cr_2O_3$, (6) Ge-$Cr_2O_3$, and (7) Si-Ge-$Cr_2O_3$.

The substances Si, Ge, and $Cr_2O_3$ excel the aforementioned amorphous carbon in resistance to corrosion and resistance to weather conditions. The elements Si and Ge exhibit fairly satisfactory lubricating property. $Cr_2O_3$ is rigid and capable of enhancing the CSS resistance of the protective film.

The second layer of amorphous carbon or graphite containing amorphous carbon excels in lubricating property. Particularly, a layer of amorphous carbon or graphite containing amorphous carbon of a species having specific resistance in the range of $10^{-2}$ to $10^2$ $\Omega.cm$ possesses high lubricating property and high abrasion resistance. If the specific resistance is less than $10^{-3}$ $\Omega.cm$, while the lubricating property is satisfactory, the wear is heavy and the CSS resistance is insufficient. If it exceeds $10^4$ $\Omega.cm$, the amorphous carbon assumes a texture approximating the diamond structure and shows insufficient lubricating property.

If the thickness of the protective film (the total thickness of the first and second layers) exceeds 1,000 Å, the time required for the formation of the protective film is excessively long and, at the same time, the distance between the magnetic head and the magnetic film is increased and the electromagnetic conversion property of the disc is lowered. If the thickness is excessively small, the protective film naturally fails to fulfil its function. The thickness of this film is particularly desired to be in the range of 300 to 1,000 Å.

The first layer is desired to have a thickness roughly in the range of 100 to 300 Å. If this thickness is smaller than 100 Å, the effectiveness of the first layer in improving resistance to corrosion and weather conditions is not sufficient.

If it exceeds 300 Å, while the aforementioned effectiveness is sufficient, it becomes necessary to decrease the thickness of the second layer (layer of amorphous carbon) or graphite containing amorphous carbon proportionately. This is because the total thickness of the protective film is desired to be kept from exceeding 1,000 Å as already described.

The second layer is desired to have a thickness roughly in the range of 200 to 700 Å. If this thickness is smaller than 200 Å, the effectiveness of the second layer in improving the lubricating property is not sufficient. If it exceeds 700 Å, there ensues the necessity of limiting the thickness of the first layer. In the present invention, a lubricating agent made of a varying organic substance such as perfluoroalkylpolyether, monsstearin-briacontinol-trymethoxysilane, or melamine-cyanurate may be applied on the protective film.

The first layer containing $Cr_2O_3$, Si, and Ge formed on the magnetic film excels in resistance to corrosion and weather conditions. The second layer of amrophous carbon or graphite containing amorphous carbon excels in lubricating property.

The protective film incorporated in the magnetic recording medium of this invention combines the merits of the first and second layers. Since the protective film of the magnetic recording medium of this invention excels in resistance to corrosion and weather conditions, it enables the magnetic film to enjoy ample protection and the magnetic recording medium to excel in durability. Further, this protective film exhibits extremely high lubricating property and excels also in practicability.

The magnetic film and the protective film can be formed by the sputtering technique.

For the purpose of this sputtering, a conventional sputtering device which comprises a device casing provided with a target and a base for mounting a sample, a heater for heating the interior of the casing, a vacuum pump for vacuumizing the interior of this casing, and a gas cylinder connected to this casing is conveniently used. The target to be used in this device advantageously is made of an alloy identical or similar to the composition of the alloy of the film to be formed.

The sputtering is desirably carried out in an atmosphere of dilute gas or argon (Ar) gas. The pressure of this atmosphere is desired to fall in the range of 1 to 100 m.Torr, preferably 5 to 50 m.Torr as total pressure. The vessel in which the sputtering is to be performed is desired to be evacuated to a vacuum not exceeding $10^{-5}$ Torr before the aforementioned atmosphere for sputtering is formed.

Preparatory to the sputtering, the substrate may be heated or it may be kept at room temperature. When the substrate is heated, the elevated temperature of the substrate is desired not to exceed 250° C., preferably 220° C. The sputtering time can be determined by dividing the thickness of the film to be formed by the average speed of film formation.

The sputtering device is desired to be such as to permit adjustment of various conditions such as temperature, atmosphere, and pressure of atmosphere. Examples of the sputtering device well known in the art and usable for the purpose of this invention include a high-frequency magnetron sputtering device, a circular magnetron sputtering device, a planar magnetron sputtering device, a cylindrical electrode type magnetron sputtering device, an ion beam sputtering device, a high-frequency sputtering device, and a DC dipolar sputtering device.

An intermediate layer capable of enhancing the adhesive strength of the magnetic film may be interposed between the substrate and the magnetic film in addition to the undercoating layer. An about 50 to 500 Å thick layer of Cr, V or Mn is desired to be interposed therebetween.

This invention can be embodied in disc-shaped magnetic recording media ranging in diameter from 1 to 2 inches to 10 inches or more.

Now, the present invention will be described more specifically below with reference to working examples. The working examples cited below invariably made use of a magnetron r.f. sputtering device. Naturally, this invention can be embodied similarly effectively by using an ion beam sputtering device, for example, which is equivalent from the ion engineering point of view.

EXAMPLE 1

A substrate made of an aluminum alloy containing 4% of magnesium (measuring 130 mm in diameter, 40 mm in inside diameter, and 1.9 mm in thickness) had its surface flattened and smoothened by lathing. Then, on the machined substrate, a Ni-P layer was formed in a thickness of 25 μm by the electroless plating technique. One side of the Ni-P layer was ground off in a thickness of about 2 μm, scratched randomly to sustain cuts 0.05 to 0.1 μm in depth (texturing treatment), and finish ground to specular smoothness.

Then, by the use of a planar magnetron r.f. sputtering device, an undercoating layer of Cr was deposited in a thickness of 3,000 Å and, immediately, a Co-Ni film was formed thereon under the following conditions.

| | |
|---|---|
| Initial evacuation | $2 \times 10^{-6}$ Torr |
| Sputtering atmosphere | Ar |
| Pressure of sputtering atmosphere | 12 m.Torr |
| Electric power supplied | 1 Kw |
| Target composition | 20 at. % of Ni (balance of Co) |
| Electrode distance | 108 mm |
| Thickness of magnetic film | 500 Å |
| Speed of film formation | 200 Å/min |
| Substrate temperature | 200° C. |

A protective film of Si was formed by sputtering in thickness of 200 Å by following the procedure described above, except that the target was formed of Si of purity of 99.99%. On this protective film, a C layer was formed in a thickness, to complete a magnetic recording medium. This magnetic recording medium was tested for CSS resistance. In the test for CSS resistance, a sample 5¼ inches in diameter provided with a protective film was mounted on a disc drive 5-14″ in diameter. The head used in the test was of a Mn-Zn Winchester type, with the float of the head at an interval peripheral part R=50 cm fixed at 0.45 μm (at the level of 3,600 rpm. The CSS cycle was as shown in FIG. 1.

The life of the CSS resistance was judged as ended at the point at which the loss of the replay output from the level at the start amounted to 10% or whenever the number of errors increased even by one.

The test results are shown in Table 1.

EXAMPLE 2

A magnetic recording medium was produced by following the procedure of Example 1, except that the material of the first layer of the protective film and the thickness of the first and second layers were changed as shown in Table 1.

The results of the test for CSS resistance are shown in Table 1.

COMPARATIVE EXAMPLE 1

Magnetic recording media were produced by following the procedure of Example 1, except that $SiO_2$, osmium, silicon nitride, silicon carbide, and diamond-structure carbon were used independently as materials for their protective films. These magnetic recording media were tested for CSS resistance.

The results are shown in Table 1.

It is noted from Table 1 that in the magnetic recording media according with this invention, the protective films showed high levels of lubricating property.

Separately, samples were prepared in which protective films were made respectively of osmium, silicon nitride, silicon carbide, and diamond-structure carbon in a fixed thickness of 400 Å. In the test for CSS resistance, they invariably showed CSS resistance not exceeding 10K. Even when a lubricating agent of fluorocarbon type was applied in a thickness of about 100 Å on the protective films, the CSS resistance was invariably less than 20K. Since the CSS resistance is generally required to exceed 10K or 20K, these protective films were deficient in CSS resistance in due consideration of allowance.

EXAMPLE 3

Figure 2:
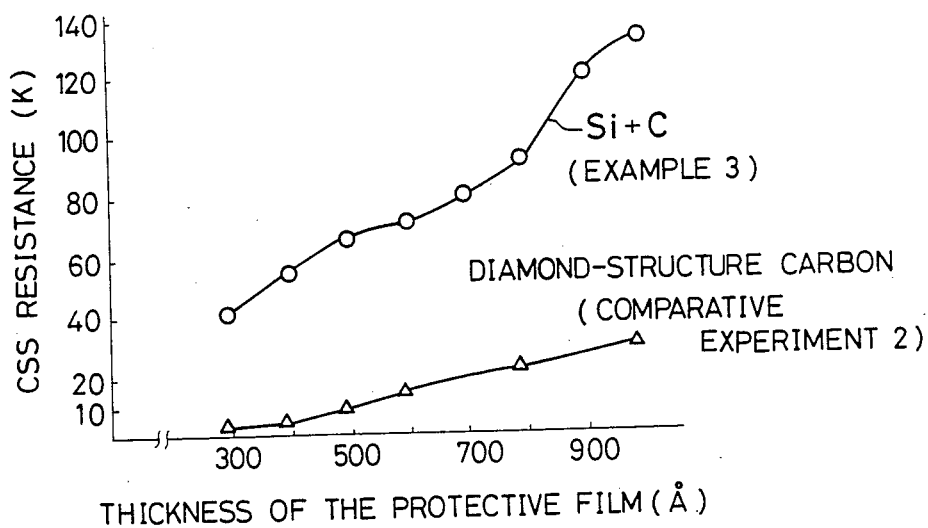
FIG. 2 and FIG. 3 are graphs showing the results of measurement in the working examples and the comparative experiments.

Magnetic recording media were produced by following the procedure of Example 1, except that the total thickness of the protective film was varied in the range of 300 to 1,000 Å with the ratio of the thicknesses of the first and second layers fixed at 1:2. The magnetic recording media were tested for CSS property. The results are shown in FIG. 2.

TABLE 1

| No. | Example No. and Comparative Experiment No. | Magnetic film Composition (at. %) | Thickness (Å) | Protective film First layer Composition | Thickness (Å) | Thickness (A) of second layer (C layer) | CSS resistance (K cycles) |
|---|---|---|---|---|---|---|---|
| 1 | Example 1 | Co—20Ni | 500 | Si | 200 | 300 | 60 |
| 2 | Example 2 | Co—20Ni | 500 | Si | 100 | 700 | 130 |
| 3 | Example 2 | Co—20Ni | 500 | Si | 300 | 200 | 40 |
| 4 | Example 2 | Co—20Ni | 500 | Ge | 200 | 400 | 70 |
| 5 | Example 2 | Co—20Ni | 500 | Ge + Si | (100 + 100) | 300 | 50 |
| 6 | Example 2 | Co—20Ni | 500 | $Cr_2O_3$ | 100 | 400 | 70 |
| 7 | Example 2 | Co—20Ni | 500 | Si + $Cr_2O_3$ | (100 + 100) | 400 | 80 |
| 8 | Example 2 | Co—20Ni | 500 | Si + Ge + $Cr_2O_3$ | (100 + 100 + 100) = 300 | 300 | 50 |
| 9 | Example 2 | Co—20Ni | 500 | $Cr_2O_3$ | 200 | 400 | 75 |
| 10 | Comparative Experiment 1 | Co—20Ni | 500 | $SiO_2$ | 600 | None | 25 |
| 11 | Comparative Experiment 1 | Co—20Ni | 500 | Osmium | 600 | None | 15 |

TABLE 1-continued

| No. | Example No. and Comparative Experiment No. | Magnetic film Composition (at. %) | Thickness (Å) | Protective film First layer Composition | Thickness (Å) | Thickness (A) of second layer (C layer) | CSS resistance (K cycles) |
|---|---|---|---|---|---|---|---|
| 12 | Comparative Experiment 1 | Co—20Ni | 500 | Silicon nitride | 600 | None | 10 |
| 13 | Comparative Experiment 1 | Co—20Ni | 500 | Silicon carbide | 600 | None | 12 |
| 14 | Comparative Experiment 1 | Co—20Ni | 500 | Diamond-structure C | 600 | None | 16 |

COMPARATIVE EXAMPLE 2

Magnetic recording media were produced by following the procedure of Comparative Experiment 1 using protective films of diamond-structure carbon in varying thicknesses of 300 to 1,000 Å and they were tested for CSS resistance. The results are shown in FIG. 2.

It is noted from FIG. 2 that the magnetic recording media according with the present invention excelled in CSS resistance. The results indicate naturally that the CSS resistance improves in proportion as the film thickness increases.

Some of the magnetic recording media of the foregoing working examples and comparative experiments shown in Table 1 were further tested for resistance to corrosion and weather conditions.

This test was carried out by a procedure comprising the steps of keeping a sample immersed in pure water of specific resistance of 3 MΩ.cm (25° C.) for one week and measuring the amount of loss (ΔBr) of saturated magnetic flux density (Br). The results are shown in Table 2.

Figure 3:
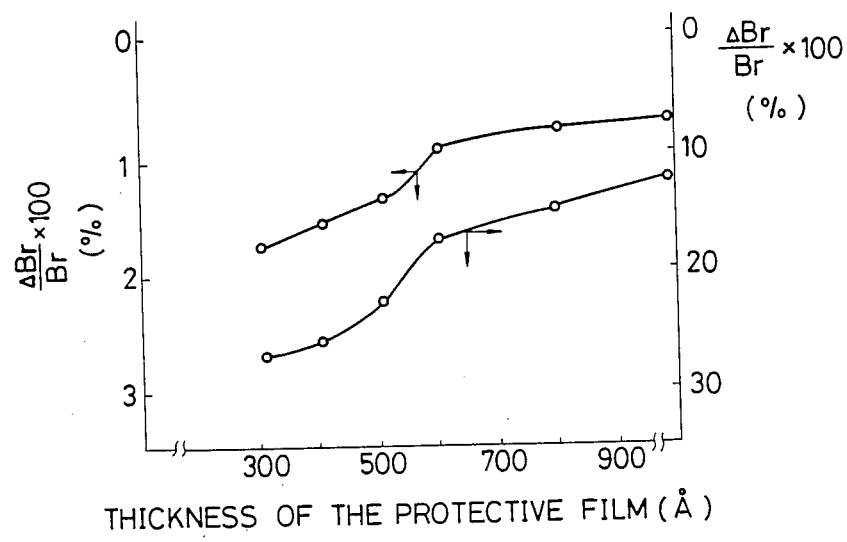

FIG. 3 is a graph showing the results of the test for resistance to corrosion and weather conditions conducted similarly on the samples of Example 3 and Comparative Experiment 2.

It is noted from Table 2 and FIG. 3 that the magnetic recording media according with the present invention are excellent in resistance to corrosion and weather conditions.

TABLE 2

| No. of Table 1 | Example No. and Comparative Experiment No. | (ΔBr/Br) × 100 (%) |
|---|---|---|
| 1 | Example 1 | 1.0 |
| 2 | Example 2 | 1.3 |
| 4 | Example 2 | 1.4 |
| 5 | Example 2 | 1.5 |
| 6 | Example 2 | 1.0 |
| 8 | Example 2 | 1.5 |
| 10 | Comparative Experiment 1 | 14 |
| 11 | Comparative Experiment 1 | 16 |
| 12 | Comparative Experiment 1 | 17 |
| 13 | Comparative Experiment 1 | 13 |
| 14 | Comparative Experiment 1 | 18 |

Obviously, many modifications and variations of the present invention are possible in light of the foregoing teachings. It is therefore to be understood that within the scope of the appended claims, the present invention may be practiced otherwise than as specifically described herein.

What is claimed is:

1. A magnetic recording medium comprising a disc-shaped substrate, a magnetic film formed on the surface of said substrate, and a protective film formed on the surface of said magnetic film, said protective film being composed of a first layer consisting essentially of elemental silicon having a thickness in the range of 100 to 300 Å, and a second layer containing amorphous carbon having a thickness in the range of 200 to 700 Å and a speciic resistance in the range of $10^{-3}$ to $10^4$ Ω.cm formed on said first layer.

2. A magnetic recording medium comprising a disc-shaped substrate, a magnetic film formed on the surface of said substrate, and a protective film formed on the surface of said magnetic film, said protective film being composed of a first layer containing at least one substance selected from the group consisting of $Cr_2O_3$ and Ge having a thickness in the range of 100 to 300 Å, and a second layer containing amorphous carbon having a thickness in the range of 200 to 700 Å and a specific resistance in the range of $10^{-3}$ to $10^4$ Ω.cm formed on said first layer.

3. A magnetic recording medium according to claim 2, wherein said second layer is made of amorphous carbon or graphite containing amorphous carbon having specific resistance in the range of $10^{-2}$ to $10^2$ Ω.cm.

4. A magnetic recording medium according to claim 2, wherein said substrate is made of aluminum or aluminum-based alloy.

5. A magnetic recording medium according to claim 2, wherein said substrate is made of aluminum-based alloy containing not more than 7% by weight of magnesium.

6. A magnetic recording medium according to claim 2, wherein said magnetic film is made of alloy of one of the compositions of Co-Ni, Co-Ni-Pt, Co Ni-P, Co-Cr, Co-Cr-Pt, Co-Ni-Cr and Co-P.

7. A magnetic recording medium according to claim 2, wherein said magnetic film is made of Co-Ni alloy containing Ni in a concentration of 5 to 35 at. %.

8. A magnetic recording medium according to claim 2, wherein said magnetic film is made of Co-Ni-Pt alloy containing 5 to 40 at. % of Ni and not more than 12 at. % of Pt.

9. A magnetic recording medium according to claim 2, wherein said magnetic film is made of Co-Ni-P alloy containing 5 to 40 at. % of Ni and not more than 12 at. % of P.

10. A magnetic recording medium according to claim 2, wherein said magnetic film is made of Co-Cr alloy containing 5 to 20 at. % of Cr.

11. A magnetic recording medium according to claim 2, wherein said magnetic film is made of Co-Cr-Pt alloy containing 5 to 20 at. % of Cr and 1 to 10 at % of Pt.

12. A magnetic recording medium according to claim 2, wherein said magnetic film is made of Co-Ni-Cr alloy containing 10 to 35 at. % of Ni and 3 to 15 at % of Cr.

13. A magnetic recording medium according to claim 2, wherein said magnetic film and said protective film are formed by the sputtering technique.

14. A magnetic recording medium according to claim 4, wherein an undercoating layer harder than said substrate is interposed between said substrate and said magnetic film.

15. A magnetic recording medium according to claim 2, wherein a layer capable of enabling said magnetic film to adhere with greater fastness to said substrate is interposed between said substrate and said magnetic film.

16. A magnetic recording medium according to claim 2, wherein a lubricating agent is applied on said protective film.

17. A magnetic recording medium according to claim 2, wherein said first layer of said protective film is formed of a substance selected from the group consisting of Ge, $Cr_2O_3$, a mixture of Si and Ge, a mixture of Si and $Cr_2O_3$, a mixture of Ge and $Cr_2O_3$, and a mixture of Si and Ge and $Cr_2O_3$.

* * * * *